Nov. 13, 1956    E. C. SEDA    2,770,469
AGRICULTURAL IMPLEMENT WHEEL SCRAPER ASSEMBLY
Filed Feb. 8, 1955
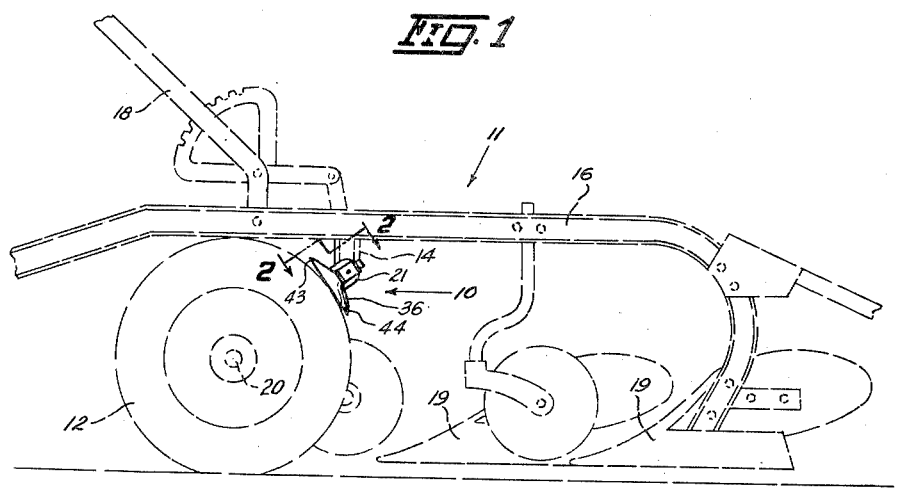
INVENTOR.
EDWARD C. SEDA
BY Rudolph L. Lowell
ATTORNEY.

United States Patent Office 2,770,469
Patented Nov. 13, 1956

2,770,469

AGRICULTURAL IMPLEMENT WHEEL SCRAPER ASSEMBLY

Edward C. Seda, Traer, Iowa

Application February 8, 1955, Serial No. 486,782

3 Claims. (Cl. 280—158)

This invention relates generally to vehicle wheel scrapers and more particularly to a wheel scraper assembly adapted to be rotatably mounted on agricultural implements for scraping mud and dirt from the implement wheels.

An object of this invention is to provide an improved wheel scraper assembly for agricultural implements.

A further object of this invention is to provide a wheel scraper assembly which is adapted to be quickly secured directly to an implement axle or frame for positioning a scraping disc adjacent an implement wheel.

Another object of this invention is to provide an adjustably mounted wheel scraper assembly of disc type which is applicable to various implements and adjustable relative to an implement wheel when in a mounted position.

A further object of this invention is to provide a rotatably mounted wheel scraper assembly of disc type which is simple in construction, readily mounted on substantially all types of agricultural implements, and efficient in operation to maintain the implement wheels free of mud and dirt at all times.

Further objects, features and advantages of this invention will become apparent from a consideration of the following description when taken in connection with the accompanying drawing in which:

Fig. 1 is a side elevational view of a farm plow showing the wheel scraper assembly of this invention in assembly relation therewith;

Fig. 2 is an enlarged fragmentary view looking substantially along the line 2—2 in Fig. 1, with an adjusted position of the scraper shown in dotted lines;

Fig. 3 is an enlarged fragmentary side elevational view of the wheel and scraper assembly shown in Fig. 1; and Fig. 4 is a fragmentary sectional view taken substantially along the line 4—4 in Fig. 2.

With reference to the drawing, the wheel scraper assembly of this invention, indicated generally at 10, is illustrated in Fig. 1 in assembly relation with a farm plow 11 having a pair of ground wheels 12, only one of which is shown. The plow 11 is of the well-known type having an inverted U-shape axle 13 with a base portion 15 carried in bearings 14 secured to the plow frame 16. The axle 13 has laterally extended leg or end portions 17 which terminate in shafts 20 upon which are rotatably mounted the ground wheels 12. The leg portions 17 are movable up and down about the bearings 14 in response to manipulation of a lever 18 to raise and lower the ground wheels 12 relative to the frame 16. Up and down movement of the plow wheels 12 moves the plow tools 19, arranged rearwardly of the wheels 12, into and out of ground engaging positions.

A scraper assembly 10 is provided for each ground wheel 12 and is adapted to be supported on the axle portion 17 adjacent each wheel 12. For this purpose, each scraper assembly 10 includes an upright mounting bar 21 having a laterally offset lower end portion 22 which is clamped to the axle portion 17 by a U-bolt 23. The offset bar portion 22 provides for a location of the upper end portion 26 of the bar 21 in a plane substantially parallel to the plane of rotation for the wheel 12. Stop plates 24 (Fig. 2), only one of which is shown, are secured to the bar portion 22 and straddle the axle portion 17 to maintain the bar 21 against any movement transversely of the axle portion 17.

Extended through the upper end portion 26 of the mounting bar 21, so as to be substantially perpendicular thereto, is a support rod 27 having a threaded portion 28 which is clamped to the bar 21 by nuts 29, positioned against the opposite ends of the mounting bar 21.

Secured to the end 31 of the supporting rod 27 is a tubular bearing 32 extended transversely of the rod 27 and provided with a grease fitting 33. A shaft 34, positioned within the bearing 32, carries at its lower end a curved disc 36, of a diameter slightly greater than the width of the wheel 12, and with the concave side of the disc 36 facing the peripheral or ground engaging surface 38 of the wheel 12. The opposite or upper end 39 of the shaft 34 carries a washer 41 and a pin or cotter key 42 for removably maintaining the shaft 34 within the bearing 32.

In the use of a wheel scraper assembly 10 with the wheel 12, the mounting bar 21 is secured to the adjacent axle portion 17 by means of the U-bolt 23 as shown in Fig. 2. The nuts 29 on the supporting rod 27 are adjusted so that the shaft 34 for the disc 36 is positioned inwardly of the longitudinal center 40 of the wheel 12.

As best appears in Fig. 1, the entire shaft 34 is arranged upwardly of the disc 36. As a result, the disc 36 may be positioned opposite the wheel surface 38, without interference from the shaft 34, providing for the use of a smaller disc 36. If the shaft 34 extended below the disc 36, it would be necessary to position the disc 36 to one side of the wheel 12 and thus require a larger disc for extending laterally of the wheel 12 to scrape the wheel surface 38. The bearing 32 for the shaft 34 is positioned such that the disc 36 is arranged in a plane which is at an angle relative to a plane tangent to the adjacent portion of the wheel surface 38. In other words, as best appears in Fig. 1, the rear edge 44 of the disc 36 is arranged closer to the wheel surface 38 than is the front edge 43 of the disc 36.

With the disc 36 thus arranged relative to the wheel 12, and with the wheel 12 rotating in a counterclockwise direction as viewed in Fig. 1, corresponding to a forward movement of the plow 11, mud or dirt on the surface or periphery 38 of the wheel 12 contacts the rear edge 44 of the disc 36 and is scraped from the wheel 12 by the rotation of the disc 36 as effected by its engagement with the mud to be scraped. It is apparent, of course, that by virtue of the mounting of the disc 36 on the axle 13, the predetermined relative position of the wheel 12 and disc 36 shown in Fig. 1 is maintained when the tools 19 are lowered into the ground. By virtue of the inward spacing of the disc shaft 34 relative to the center 40 of the wheel surface 38, the contact of mud and dirt with the disc 36 occurs or takes place at a position spaced from the center point of the disc 36 to thus cause the disc 36 to rotate in a counterclockwise direction when viewed from the concave side 37 thereof.

Some of the mud and dirt thus scraped from the wheel 12 travels with the disc 36 which acts to move the mud and dirt to one side of the wheel 12. Also some of the mud and dirt scraped loose by the disc 36 travels with the wheel 12 so as to pass between the wheel 12 and the disc 36. It has been found in practice that the disc 36 should have an axial dimension, indicated at A, in Fig. 4, of about one-tenth the diameter of the disc 36 to prevent this material from clogging between the wheel surface 38 and the disc 36.

In one embodiment of the invention, the disc 36 is ten inches in diameter and has an axial dimension of one inch. Such a disc is arranged so that its forward edge 43 is about one-half inch from the closest part of the wheel surface 38 and its rearward edge 44 is about one-fourth inch from the closest part of the surface 38.

It can thus be seen that the disc 36 is continually moving across the surface 38 of the wheel 12, by virtue of the rotation of the disc 36, and along or peripherally of the surface 38 of the wheel 12, by virtue of the rotation of the wheel 12. An efficient scraping action is thus imparted to the surface 38 of the wheel 12, without any contact of the disc 36 with the wheel surface 38.

As best appears in Fig. 2, the relative positions of the disc 36 and the wheel 12, in a direction transversely of the plow 11, is adjustable merely by manipulation of the nuts 29 on the rod 27 to move the rod 27 transversely of the plow 11. Thus, the disc 36 may be readily set and maintained in the desired position relative to the wheel surface 38 on substantially any farm implement. Also, on loosening of the nuts 29, the rod 27 and the bearing 32 carried thereby may be turned to adjust the inclination of the disc 36 relative to the tire surface 38. This inclination is also, therefore, readily set and maintained during the use of the disc 36 to provide for the most efficient scraping action.

From a consideration of the above description, it is seen that this invention provides a wheel scraper assembly 10 which is readily mounted on an agricultural implement and which is readily adjustable to provide for the desired scraping action of the disc 36 relative to the wheel surface 38. Although the scraper assembly 10 has been particularly described for use on a plow 11, it is apparent that the assembly 10 may be satisfactorily mounted on and used with any agricultural implement by merely attaching the supporting bar 21 to a convenient axle or frame portion of the implement.

Although the invention has been described with respect to a preferred embodiment thereof, it is to be understood that it is not to be so limited, and changes can be made therein which are within the full intended scope of this invention as defined by the appended claims.

I claim:

1. For use on an agricultural implement having a ground wheel, a wheel scraper assembly comprising a scraper disc having a supporting shaft extended only from one side thereof, a bearing for said shaft, and means for mounting said bearing on said implement at a fixed position providing for the location of said disc in a position in which the opposite side thereof is adjacent to and at an angle relative to the periphery of said wheel, with said shaft being positioned inwardly of the transverse center of the ground engaging surface of said wheel to provide for rotation of said disc on contact therewith of mud and dirt adhering to said wheel.

2. A wheel scraper assembly for the wheel of an agricultural implement, said assembly comprising a mounting bar adapted to be rigidly attached to said implement, a support rod adjustably secured to said mounting bar, a bearing carried by said support rod, a shaft rotatably supported in said bearing, and a disc mounted at one end of said shaft, with said disc having a concave side adapted to be arranged adjacent the periphery of said implement wheel.

3. For use with an agricultural implement having an axle with a wheel on one end thereof, a scraper assembly for said wheel comprising a mounting bar removably attached in a fixed position to said axle, a support rod adjustably attached to said bar and extended transversely of said implement toward said wheel, with said rod being adjustably rotatable about the axis thereof and movable transversely of said implement, a bearing member secured to and extended transversely of said rod at a position adjacent to said wheel, a shaft carried by said bearing, and a scraper disc secured to one end of said shaft and positioned adjacent the periphery of said wheel, with adjustment of said rod providing for said disc being adjustable both as to the inclination thereof relative to said wheel and the position thereof transversely of said wheel.

References Cited in the file of this patent

UNITED STATES PATENTS

| | | |
|---|---|---|
| 2,189,253 | Schuman | Feb. 6, 1940 |
| 2,454,002 | Paluck | Nov. 16, 1948 |
| 2,484,948 | Iafrate | Oct. 18, 1949 |